Nov. 3, 1959   M. D. LACKEY   2,910,889
TWO-ENGINE COMPOUND
Filed Dec. 16, 1957
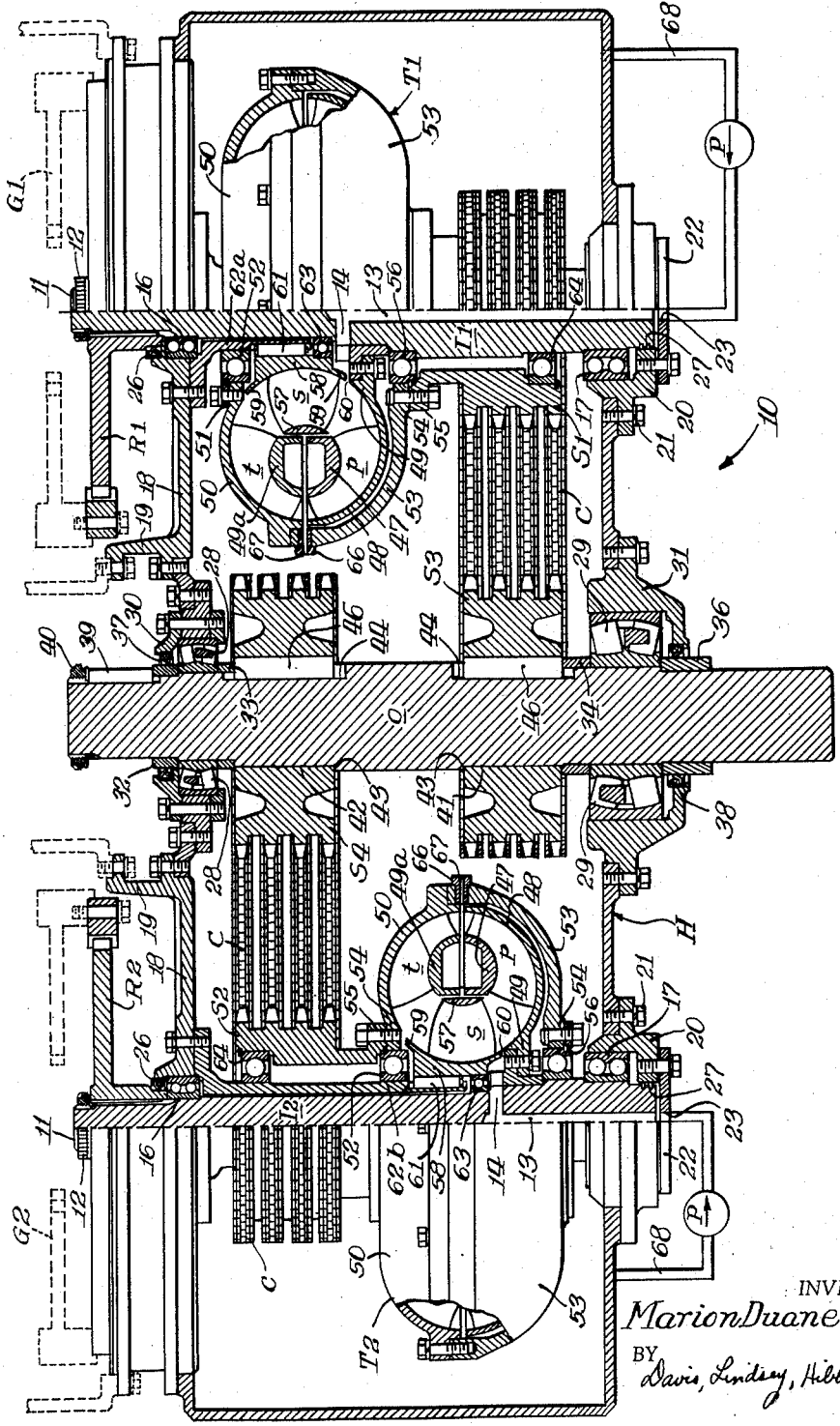
INVENTOR.
Marion Duane Lackey,
BY
Davis, Lindsey, Hibben & Noyes
Atty's.

United States Patent Office 2,910,889
Patented Nov. 3, 1959

2,910,889

TWO-ENGINE COMPOUND

Marion Duane Lackey, Tulsa, Okla., assignor to Unit Rig & Equipment Company, Tulsa, Okla., a corporation of Delaware Application December 16, 1957, Serial No. 703,131

3 Claims. (Cl. 74—665)

This invention relates to a power compounding transmission system, and more particularly relates to a drive compound utilizing a pair of novelly arranged torque converters for delivering driving torque from separate engine driven input shafts to a single output shaft.

Various types of power transmission systems have been proposed for combining the power outputs of one or more separate engine units into a single output through one output shaft. One instance where such a system is used is in oil well drilling equipment, in which the power of several separate engine units is compounded to perform the various accessory functions as well as the drilling operation. Heretofore, conventional power compounding transmission systems were large bulky devices, and in many instances employed mechanical clutches for connecting the various individual power units into unitary driving relationship. Such systems were costly, space consuming, and produced considerable system shock loads when a power unit was engaged. In addition, power compounding systems employing mechanical clutches also necessitated frequent adjustment and replacement of the clutch units, which resulted in shutdowns and interruption of normal operations.

In order to eliminate the disadvantages of power compounding transmission systems using mechanical clutches, various types of fluid couplings and torque converters were proposed and developed. The fluid couplings and torque converters thus advanced eliminated many of the disadvantages of mechanical clutch drives, but remained large, costly systems, of complex construction and operation. Thus fluid couplings or torque converters were usually symmetrically arranged in an enclosing housing, such that the composite compounding unit was unnecessarily large, as well as presenting lubrication, bearing and mounting problems. Moreover, such symmetrical arrangement necessitated an increased number of parts because many of them had to be made right and left hand. Compounds that employed a torque converter drive placed the torque converters outside the torque compounding mechanism housing, thereby further increasing the overall physical dimensions of the compounding assembly.

Accordingly, the general object of the invention is to provide an improved power compounding transmission system utilizing a pair of novelly arranged torque converters, the assembly being of minimum overall physical dimensions.

Still another object of the invention is to provide an improved power compounding transmission utilizing a pair of torque converters, wherein substantially all of the components and parts of the assembly are interchangeable.

A still further object of the invention is to provide an improved power compounding transmission system employing a pair of novelly constructed and arranged torque converters, wherein means are provided for dumping working fluid from the pumping chambers of the torque converters to concurrently control the output from the torque converters to the output shaft, as well as to lubricate the drive between the engine driven input shafts and the output shaft.

Many other objects and advantages of the invention will be apparent upon making reference to the detailed description that follows and accompanying drawing, which illustrates a preferred embodiment thereof and in which like reference numerals and letters have been used to identify identical parts.

The drawing illustrates a two-engine converter compound transmission system, partly in section and with some parts in phantom, constructed according to the principles of the invention.

The present invention provides a power transmission system in the form of an improved two-engine converter compound, which utilizes a pair of novelly arranged torque converters in a single system. In addition, the present invention generally contemplates a novel torque converter construction and drive train, wherein a high degree of parts interchangeability is provided for, to reduce servicing and maintenance costs. The present invention further contemplates the employment of a novel combination lubrication and engine disconnect construction in the torque converter casings, such that torque transmission from the separate power units to the output shaft may be regulated by controlling the flow of an associated pump supplying working fluid to the torque converter pumping chambers, and lubrication of the drive train connection between the separate engine unit input shafts to the output shaft is assured at all times by a bleed flow of working fluid from the torque converter casings.

Briefly described, the present invention generally contemplates a two-engine converter compound employing a pair of staggered, or alternately arranged torque converters, that are enclosed in a single housing and carried by a pair of driving shafts rotatably journalled in the housing adjacent a centrally disposed common output shaft. Each torque converter, and the other related components of the compound, are so constructed as to be substantially identical with other corresponding parts, thereby providing a high degree of parts interchangeability. The compound also employs a novel combination disconnect and lubrication system for the drive train, such that the output from each or both of the torque converters can be readily controlled by regulating the output of an associated pump, which supplies working fluid to the pumping chambers of the torque converters, means being provided on the peripheries of the torque converter casings for dumping working fluid therefrom, in the vicinity of the drive train elements and at a predetermined rate, to thus provide lubrication for the driving elements whenever the compound is in operation. The torque converter working fluid thus serves to lubricate the various bearing assemblies and drive train of the system.

In the preferred form of the invention illustrated in the drawing, the two-engine converter compound power transmission system assembly is designated generally by the reference numeral 10, and includes a housing H, that encloses the compound and rotatably journals a pair of laterally spaced input shafts I1 and I2 and a centrally disposed output shaft O, mounted between the input shafts. Each input shaft, I1 and I2, carries a torque converter assembly T1 and T2, respectively, which drive a corresponding pair of drive members, preferably sprockets S1 and S2, mounted on the respective input shafts.

The input shafts I1 and I2 are arranged to receive power from separate engine units (not shown). In the present instance, the input shafts are shown as connected at their inner ends to the flywheels G1 and G2 of the respective engines by a connection which does not require accurate alignment of the input shafts with the crankshafts of the engines. Thus, a pair of toothed members R1 and R2 are mounted on the respective inner ends of the input shafts and mesh with ring gears secured to the flywheels G1 and G2. The two-engine compound converter assembly 10 also includes a pair of axially spaced driven members, preferably sprockets S3 and S4, carried by the output shaft O, which are connected to the driving sprockets S1 and S2, respectively, by drive means, such as chains C. Each torque converter, drive sprocket, chain and driven sprocket thus constitute means for transmitting power from the input shafts I1 and I2 to the output shaft O to thus complete the drive train for the compound converter assembly 10.

It will be understood that while the drive compound assembly 10 has been illustrated as a two-engine driven unit, a compound employing more than the illustrated number of engine units could also be constructed without departing from the concepts of the invention.

The input shafts I1 and I2 are preferably positioned in the housing H, adjacent and on opposite sides of the centrally disposed output shaft O, and the respective torque converter assemblies T1 and T2 and sprockets S1—S4 are positioned in a generally alternating, staggered relationship on the input shafts, the torque converter T1 and drive sprocket S2 being positioned adjacent the inner side of the housing H, and the torque converter T2 and drive sprocket S1 being positioned adjacent the outer side of the housing H. Thus, the torque converter T1 is opposite the drive sprocket S2 and the torque converter T2 is opposite the drive sprocket S1. In prior structures the torque converters and sprockets have been mounted in a symmetrical arrangement and have thus required much more space. The toothed members R1 and R2 are secured to the inner ends of the input shafts I1 and I2 by a keyed connection and the adjacent end of each shaft is threaded as at 11 to receive a lock nut 12. The input shafts I1 and I2 are also formed with central axial bores or working fluid supply passages 13 therethrough, which extend inwardly from the outer ends and which are intersected by registering radial bores or passages 14, the passages 13 and 14 together defining a working fluid flow path, whose purpose and function will be described in more detail later.

Each of the input shafts I1 and I2 is rotatably journalled adjacent their inner and outer end portions in the housing H by bearing assemblies 16 and 17, respectively, which accommodate thrust loads therefrom and are preferably of the double ball bearing type. The bearing assemblies 16 are each retained by housing closure members 18, which members include an annular flanged portion 19 defining an annular mounting hanger for connecting the coverter assembly 10 to corresponding bell housings or similar mountings on the separate engine units, as generally indicated in dotted line in the drawing.

The bearing assemblies 17 are similarly carried in annular cages 20, that are suitably connected to end walls of the housing H opposite the housing closure member 18, as for example by screws 21. A pair of cover plates 22, which are centrally apertured as at 23, are provided to close the open end of the bearing cages 20 and to provide central registry with the axial bores 13 in the input shafts I1 and I2, for a purpose and function that will become more apparent as the description proceeds.

Annular seal assemblies 26 are provided adjacent the bearing assemblies 16 to prevent fluid leakage between the housing closure members 18 and input shafts I1 and I2. A pair of annular seal assemblies 27 are also provided around the ends of the input shafts I1 and I2, adjacent the bearing assemblies 17, to prevent fluid leakage between the bearing cages 20 and remote ends of the input shafts I1 and I2.

The centrally disposed output shaft O is generally similar to the input shafts I1 and I2, in that it is rotatably journalled at its inner and outer ends in the housing H by a pair of bearing assemblies 28 and 29, respectively, which are positioned adjacent the housing closure members 18 and input shaft cover plates 22, respectively, and which are preferably of the spherical roller type. Each of the spherical bearing assemblies 28 and 29 are suitably retained in the end walls of the housing H by bearing cage assemblies 30 and 31, respectively, which absorb loads transmitted to the bearing assemblies 28 and 29 from the output shaft O. Retainer sleeves 32 and 33 are provided to maintain axial alignment between the bearing assembly 28 and the journal surfaces of the output shaft O, and a corresponding pair of retaining sleeves 34 and 36 are also provided to maintain axial alignment between the bearing assembly 29 and the journals of the output shaft O. Annular seal assemblies 37 and 38, similar to the seal assemblies 26, are provided to prevent fluid leakage between the output shaft O and bearing cage assemblies 30 and 31, respectively. A retaining member 39 and lock nut 40 are provided on the inner end of the output shaft O to maintain the axial position of the bearing assembly 28 and retainer sleeves 32 and 33 therewith.

In order to provide for the rigid mounting of the sprockets S3 and S4 on the output shaft O, the output shaft O is preferably formed with reduced diameter portions 41 and 42, to receive the sprockets S3 and S4, respectively, which define centrally disposed retaining shoulders 43 for engaging the sprockets S3 and S4. The reduced diameter portions 41 and 42 are formed with radially aligned keyways 44, which receive keys 46 for locking the sprockets S3 and S4 to the output shaft O. It should be understood that while a keyed connection has been illustrated between the sprocket members S3 and S4 and the output shaft O, any other suitable connection could be employed instead, as for example splines.

Thus, it will be appreciated that the output shaft O is freely rotatably journalled in the housing H by the spherical bearing assemblies 28 and 29, and that the leakage of working fluid between the bearing assemblies and output shaft from the interior of the housing H is effectively prevented by the provision of the annular seal assemblies in the bearing cages that retain the bearings and output shaft.

The torque converter assemblies T1 and T2 follow conventional construction practices, to the extent that they include driving elements, preferably annular, vaned, shrouded pump or impeller runners $p$, driven elements, preferably turbine runners $t$, and reaction members, preferably stators $s$. The torque converter assemblies T1 and T2 differ from such conventional practices in that the turbine runners $t$ are formed integrally and rigidly with an outer casing-half. Thus, each annular pump or impeller runner $p$ includes an annular inner shroud portion 47 and an annular casing portion 48, formed with a radial inwardly extending annular flanged portion 49, for connecting the casing portion 48 to the associated input shaft I1 and I2. Each turbine runner $t$ similarly includes an annular inner shroud portion 49a and an annular outer first casting-half 50, having a radial annular lip portion 51 defining a retaining wall for a bearing assembly 52. Each turbine runner $t$ also includes a second casing-half portion 53, that is substantially similar to the annular outer casing-half 50, and which extends therefrom to enclose the casing portion 48 of the pump runner $p$. The second casing-half portion 53 includes an annular lip portion 54 that provides a retaining wall for a bearing assembly 56, similar to the bearing assembly 52. The bearing assemblies 52 and 56 thus provide for relative rotation between the turbine runners $t$ and input shafts I1 and I2.

The turbine runners $t$ of the torque converter assemblies T1 and T2 are connected to their respective driving sprockets S1 and S2 at annular radial flanged portions 55 thereof, the turbine runner assembly t of the torque converter assembly T1 being connected to the sprocket S1 by the second casing-half portion 53, and the turbine runner assembly t of the torque converter assembly T2 being connected to the sprocket S2 by the outer first casing-half 50 at the annular radial flanged portion 55 thereof. The differences in connection of the torque converter assemblies T1 and T2 to the sprockets S1 and S2 permit their staggered relationship in the housing H, which contributes to the compact arrangement and reduced size of the converter drive compound assembly 10.

The vaned stator assembly or reaction members s, similarly include annular shroud portions 57 and radially inner reaction sleeve portions 58, having circumferentially extending flanged portions 59 formed thereon defining pumping chambers between the respective pump and turbine runners, and stator assemblies. The circumferentially extending flanged portions 59 are axially spaced from the pump runner casings 48 and turbine casing halves 50 to define ports 60 therebetween, for a purpose and function to be explained in more detail later. The annular reaction sleeve portions 58 are preferably connected by keys 61 to flanged sleeve members 62a and 62b of the torque converter assemblies T1 and T2, respectively, the sleeve members 62a and 62b being rigidly connected to the housing closure members 18 and thence to the housing H to hold the sleeve members stationary, in order to provide for a reversal in the direction of flow of working fluid discharging from the turbine runners into the pump runners. Due to the staggered arrangement of the torque converter assemblies T1 and T2 in housing H, the flanged sleeve member 62a is substantially shorter than the sleeve member 62b, and to this extent these parts are not interchangeable. Suitable bearing assemblies 63 and 64 are provided between the sleeve members 58, sprockets 51 and 52, and input shafts I1 and I2 to accommodate relative movement therebetween.

Thus it will be appreciated that the torque converter assemblies T1 and T2 follow conventional construction practices, but differ therefrom to the extent that the turbine runner assemblies t are formed integrally with the outer casing halves 50, which together with the casing halves 53, provide a driving connection for the output from the turbine runners t to the sprockets S1 and S2. This particular arrangement is desirable in the interests of compactness, simplicity and interchangeability of parts of the compound assembly 10, in that all of the parts on the input shafts I1 and I2 are interchangeable with the exception of the input shafts I1 and I2 themselves and the stator sleeve members 62a and 62b.

In order to provide the combined turbine disconnect features of the invention, the second casing-half portions 53 of the turbine runner assemblies t are provided with one or more bleed plug members 66 which are disposed along the outer radial peripheries of the casing halves 53. The bleed plug members 66 are provided with radially extending metering bores or passages 67 that register with the pumping chambers defined in the interior of the torque converter assemblies T1 and T2. It will thus be apparent that during the operation of the torque converter assemblies T1 and T2, a predetermined quantity of working fluid will continually discharge from the interiors of the assemblies and that when the units have been shut down any residual working fluid in the pumping chambers will drain through the bleed plug members 66 to the interior of the housing H. The housing will thus act as a sump for a combination working fluid and driving train lubricant used in the operation of the converter compound assembly 10.

It will further be observed that means are provided for maintaining a flow of working fluid to the pumping chambers of the torque converter assemblies T1 and T2, to prevent bleed flow through the metering passages 67 of the plug members 66 from evacuating the chambers of working fluid, to enable the torque converters T1 and T2 to couple the input shaft I1 and I2 to the sprockets S1 and S2 to deliver torque to the output shaft O.

To this end, pump means, comprising in this instance a pair of pump members P, are provided, which have a controlled effective output and which register with the torque converter pumping chambers through a flow path defined from the interior of the housing H and pumps P, to the apertures 23 in the input cover plates 22, through the input shafts I1 and I2, and thence to the pumping chambers of the torque converters T1 and T2. A conduit 68 is provided to connect the pumps P with the housing H and apertured cover plates 22 and thus establish a complete flow path for the recirculating working fluid.

It should be understood, however, that any other source of pressurized working fluid could be supplied to the interiors of the torque converter assemblies T1 and T2 through the hollow input shafts I1 and I2. The pumps P may be engine driven and operable to perform additional functions other than maintaining a flow of working fluid to the torque converters T1 and T2 of the converter compound assembly 10.

Inasmuch as the contemplated working fluid for the torque converters T1 and T2 may be of the same type as would be used to lubricate the chain and sprocket drives, an additional lubrication advantage is realized by orienting the bleed plugs 66 in general radial coplanar alignment with the sprockets S1–S4 and connecting chains C, such that the centrifugal force component of the discharging bleed working fluid is utilized to distribute the working fluid lubricant throughout the interior of the housing H as a splash lubrication system for the various internal components and bearing assemblies of the system, which register with the interior of the housing H, either directly or through communicating passages.

Pressurized working fluid flowing through the bores 13 in the input shafts I1 and I2 also serve to lubricate the various bearing assemblies between the relatively rotating components carried by the shafts I1 and I2, in addition to the splash lubrication provided by working fluid discharging from the bleed plugs 66.

Throughout the specification reference has been made to a combination working fluid and lubricant for use in the torque converter assemblies T1 and T2 and to lubricate the various internal components of the converter drive compound assembly 10, and while no specific fluid is contemplated, any of the various petroleum base lubricants having the desired viscosity and lubricating qualities at the working conditions contemplated would suffice.

Thus it will be appreciated that I have herein disclosed and described an improved drive compound having novel features and advantages that accomplish the recited objects of my invention, the scope of which is to be limited only by the appended claims.

It will be understood that modifications and variations of my invention may be effected without departing from the scope of the novel concepts herein disclosed.

I claim:

1. A two-engine compound comprising a pair of laterally spaced input shafts respectively adapted to be connected to a pair of engines, an output shaft mounted between said input shafts, a pair of axially spaced driven sprockets mounted on the output shaft, a pair of sprockets rotatably mounted on the respective input shafts in staggered relation to each other and aligned with the respective driven sprockets, chains connecting said drive sprockets with said driven sprockets, and a pair of torque converters mounted on the respective input shafts in staggered relation to each other and each generally opposite the drive sprocket on the opposite shaft, each torque converter having a pump runner connected to its input shaft, a turbine runner, and a pair of casing halves connected to the turbine runner and enclosing the respective runners, one of said casing halves for each torque converter being connected to the drive sprocket on the input shaft on which the torque converter is mounted.

2. A two-engine compound comprising a pair of laterally spaced input shafts respectively adapted to be connected at their inner ends to a pair of engines, a housing rotatably journalling the input shafts adjacent their ends, an output shaft mounted between said input shafts, a pair of axially spaced driven sprockets mounted on the output shaft, a pair of drive sprockets rotatably mounted on the respective input shafts and aligned with the respective driven sprockets, chains connecting said drive sprockets with said driven sprockets, a pair of torque converters mounted on the respective input shafts in staggered relation to each other and each generally opposite the drive sprocket on the opposite shaft, each torque converter having a pump runner connected to its input shaft, a turbine runner, a stator and a pair of casing halves connected to the turbine runner and enclosing the same, and a sleeve member connected to said housing and rigidly secured to the stator in each of said torque converters, one of said casing halves for each torque converter being connected to the drive sprocket on the input shaft on which the torque converter is mounted.

3. A two-engine compound according to claim 2, in which the torque converters are located generally opposite the respective driven sprockets on the output shaft and having radially opening fluid bleed passages for directing working fluid generally toward said sprockets to lubricate the same.

References Cited in the file of this patent
UNITED STATES PATENTS

| | | |
|---|---|---|
| 845,850 | Carter | Mar. 5, 1907 |
| 2,305,373 | Adamson | Dec. 15, 1942 |